United States Patent [19]
Karmas

[11] 3,742,028
[45] June 26, 1973

[54] ARYL SUBSTITUTED-HYDROXY SUBSTITUTED CYCLOHEXENECARBOXYLIC ACIDS AND ESTERS

[75] Inventor: George Karmas, Bound Brook, N.J.

[73] Assignee: Ortho Pharmaceutical Corporation, Raritan, N.J.

[22] Filed: Sept. 23, 1970

[21] Appl. No.: 74,857

Related U.S. Application Data

[62] Division of Ser. No. 662,295, Aug. 22, 1967.

[52] U.S. Cl... 260/479 R, 260/332.2 A, 260/471 A, 260/471 R, 260/473 A, 260/481 R, 260/999
[51] Int. Cl............................................. C07c 65/14
[58] Field of Search ................................. 260/479 R

[56] References Cited
UNITED STATES PATENTS
2,582,253   1/1952   Hogg et al. .......................... 260/520

OTHER PUBLICATIONS
Nathan et al., Jour. Amer. Chem. Soc., Vol. 78 (1956), pages 6,163–6,166.

*Primary Examiner*—James A. Patten
*Attorney*—Alexander T. Kardos, Ralph T. Lilare et al.

[57]    ABSTRACT

Hydroxyacids and hydroxyesters of the formula:

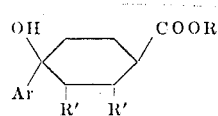

wherein R is hydrogen or lower alkyl, R' is lower alkyl and Ar is substituted aryl, are intermediates in the preparation of 2-lower alkyl-3-lower alkyl-4-aryl-cyclohexenecarboxylic acids and esters which are active agents for the suppression of animal reproduction.

4 Claims, No Drawings

ARYL SUBSTITUTED-HYDROXY SUBSTITUTED CYCLOHEXENECARBOXYLIC ACIDS AND ESTERS

This is a division of application Ser. No. 662,295 filed Aug. 22, 1967.

The compounds of the present invention are of the formula:

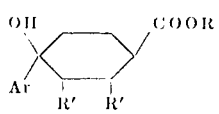

wherein R is hydrogen or lower alkyl of up to eight carbon atoms, R' is lower alkyl of up to six carbon atoms and Ar is

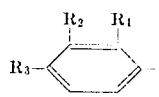

wherein $R_1$ is hydrogen, hydroxy, lower alkoxy of up to four carbon atoms, lower acyloxy of up to five carbon atoms or tetrahydropyranyle 2-oxy, $R_2$ is hydrogen, hydroxy, lower alkyl of up to four carbon atoms, lower alkoxy of up to four carbon atoms, lower acyloxy of up to five carbon atoms, chlorine, tetrahydropyranyl-2-oxy or trifluoromethyl and $R_3$ is hydrogen, hydroxy, lower alkyl of up to 4 carbon atoms, lower acyloxy of up to five carbon atoms, diethylaminoethoxy, thiomethyl, trifluoromethyl, dimethylamino tetrahydropyranyl-tetrahydrophyranyl-2-oxy, and wherein at least 1 and not more than 2 of $R_1$, $R_2$ and $R_3$ is hydrogen; 3,4-methylenedioxyphenyl, α-naphthyl or β-naphthyl.

The compounds of the present invention are prepared by the saponification of their corresponding lactones or by the reaction of an aryl Grignard reagent or an aryl lithium compound and a 2-lower alkyl-3-lower alkyl-4-ketocyclohexanecarboxylic acid. The preparation of the lactones is disclosed in my copending application Ser. No. 662,282 filed contemporaneously herewith now abandoned. The utility of the 2-lower alkyl-3-lower alkyl-4-aryl-cyclohexene-carboxylic acids and esters prepared from the compounds of the present invention is fully described in my copending application Ser. No. 662,311 filed contemporaneously herewith.

The preparation of the compounds of the invention is illustrated by the following reaction schemes:

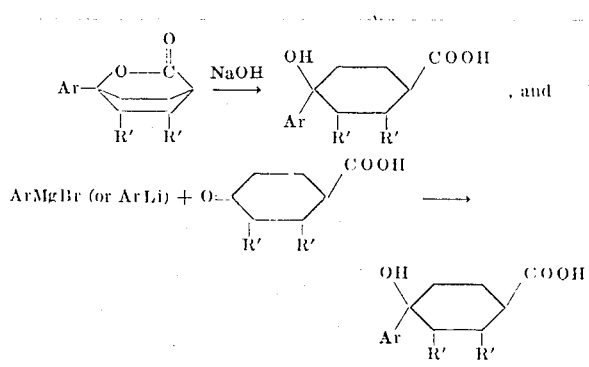

The compounds of the invention are used to prepare the final 2-lower alkyl-3-lower alkyl-4-aryl-cylohexenecarboxylic acids and esters according to the following reaction scheme:

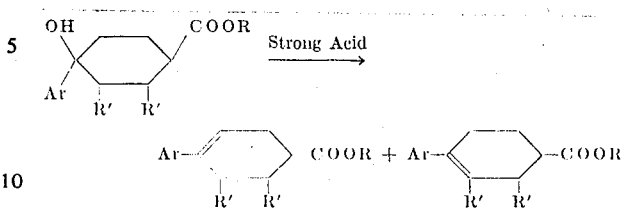

Typical lactone starting materials for the compounds of the present invention are the lactones of:
2-methyl-3-ethyl-4-hydroxy-4-(m-anisyl)cyclohexanecarboxylic acid,
2,3-dimethyl-4-hydroxy-4-(m-anisyl)cyclohexanecarboxylic acid,
2,3-diethyl-4-hydroxy-4-(m-anisyl)cyclohexanecarboxylic acid,
2-methyl-3-propyl-4-hydroxy-4-(m-anisyl)cyclohexanecarboxylic acid,
2-propyl-3-butyl-4-hydroxy-4-(m-anisyl)cyclohexanecarboxylic acid,
2,3-dimethyl-4-hydroxy-4-(m-tetrahydropyranyloxyphenyl)cyclohexanecarboxylic acid,
2,3-diethyl-4-hydroxy-4-(m-tetrahydropyranyloxyphenyl)cyclohexanecarboxylic acid,
2-ethyl-3-butyl-4-hydroxy-4-(3,4-methylenedioxyphenyl)cyclohexanecarboxylic acid,
2,3-diethyl-4-hydroxy-4-(p-trifluoromethylphenyl)cyclohexanecarboxylic acid,
2,3-dibutyl-4-hydroxy-4-(m-trifluoromethylphenyl)cyclohexanecarboxylic acid,
2-methyl-3-propyl-4-hydroxy-4-(o-methoxy-p-acetoxyphenyl)cyclohexanecarboxylic acid,
2-methyl-3-butyl-4-hydroxy-4-(o,p-diacetoxyphenyl)cyclohexanecarboxylic acid, The following examples illustrate the preparation of the compounds of the invention.

EXAMPLE I

2-Methyl-3-ethyl-4-hydroxy-4-(m-anisyl)cyclohexanecarboxylic acid

A mixture of 10.0 g. of the lactone of 2-methyl-3-ethyl-4-hydroxy-4-(m-anisyl)cyclohexanecarboxylic acid, 10.0 g. of sodium hydroxide, 100 ml. of methanol and 100 ml. of water is stirred and refluxed for two hours and is then diluted with 250 ml. of water and evaporated to remove the methanol. The solution is acidified with dilute hydrochloric acid, and is extracted with ether. The ether solution is rapidly washed with water, dried over anhydrous magnesium sulfate and filtered. The residue is recrystallized from ether to afford 2-methyl-3-ethyl-4-hydroxy-4-(m-anisyl)cyclohexanecarboxylic acid; m.p. 203°–204°C.

μmax: 2.83, 5.87 and 5.94 (split), 7.78, 8.03, 10.23, 12.80, 14.27 μ (KBr)

NMR (pyr.): 0.63, 0.75, 0.87; 1.46, 1.57; 2.96

Following the procedure of Example I, but starting with the appropriate lactone, there are prepared:

| Example | Compound formed | M.P., °C. | U.V. max. (KBr) |
|---|---|---|---|
| II | 2-methyl-3-ethyl-4-hydroxy-4-(o-anisyl)-cyclohexanecarboxylic acid. | 187–188 | 2.82, 5.87 and 5.97 (split), 7.74, 8.10, 9.67, 13.20μ. |
| III | 2-methyl-3-ethyl-4-hydroxy-4-(p-thio-anisyl)-cyclohexanecarboxylic acid. | 189–190 | 2.83, 5.90, 7.99, 10.37, 11.00, 12.29μ. |
| IV | 2-methyl-3-ethyl-4-hydroxy-4-(p-tolyl)-cyclohexanecarboxylic acid. | 201–202 | 2.82, 5.90, 8.10, 10.32, 12.27, 14.10μ. |
| V | 2-methyl-3-ethyl-4-hydroxy-4-(m-tolyl)-cyclohexanecarboxylic acid. | 154–155 | 2.82, 5.89, 8.01, 8.40, 9.60, 12.78, 62μ. |
| VI | 2-methyl-3-ethyl-4-hydroxy-4-(p-trifluoromethylphenyl)cyclohexanecarboxylic acid. | 200–201 | 2.83, 5.87 and 5.98 (split), 7.50, 8.92, 9.30, 11.81, 12.02μ. |
| VII | 2-methyl-3-ethyl-4-hydroxy-4-(m-trifluoromethylphenyl)-cyclohexanecarboxylic acid. | 160–170 | 2.85, 5.83 and 5.87 (split), 7.50, 8.60, 8.92, 12.48, 14.22, 14.49μ. |
| VIII | 2-methyl-3-ethyl-4-hydroxy-4-(β,4-methylenedioxyphenyl)cyclohexanecarboxylic acid. | 196–197 | 2.82, 5.86 and 5.94 (split), 8.00, 9.60, 10.63, 12.35μ. |
| IX | 2-methyl-3-ethyl-4-hydroxy-4-(α-naphthyl)-cyclohexanecarboxylic acid. | 177–178 | 2.82, 5.87 and 5.95 (split), 7.70, 10.13, 11.60, 12.47, 12.89μ. |
| X | 2-methyl-3-ethyl-4-hydroxb-4-(β-naphthyl)-cyclohexanecarboxylic acid. | 216–217 | 2.85, 5.90, 8.00, 8.58, 11.67, 12.20, 13.33μ. |
| XI | 2-methyl-3-ethyl-4-hydroxy-4-(α-thienyl)-cyclohexanecarboxylic acid. | 164–166 | 2.83, 5.88, 8.02, 9.62, 10.10, 11.79, 14.15, 14.33μ. |
| XII | 2-methyl-3-ethyl-4-hydroxy-4-benzyl-cyclohexanecarboxylic acid. | 142–143 | 2.88, 5.84, 8.23, 10.14, 11.51, 13.03, 14.15μ. |
| XIII | 2-methyl-3-propyl-4-(p-anisyl)cyclohexanecarboxylic acid. | 196–197 | 2.84, 5.90, 7.99, 9.57, 11.90, 12.35μ. |

EXAMPLE XIV

2-Methyl-3-ethyl-4-hydroxy-4-(m-tetrahydropyranyloxy-phenyl)cyclohexanecarboxylic acid A mixture of 10.0 g. of the lactone of 2-methyl-3-ethyl-4-hydroxy-4-(m-tetrahydropyranyloxyphenyl)cyclohexanecarboxylic acid, 10.0 g. of sodium hydroxide, 100 ml. of methanol and 100 ml. of water is stirred and refluxed for two hours. It is then diluted with 250 ml. of water and evaporated to remove methanol. The insoluble oily material is removed by extraction with ether and is discarded. 200 ml. of methylene chloride is added to the solution and the mixture is stirred and is maintained at 0°–5°C. while making the mixture barely acidic with cold dilute hydrochloric acid. The methylene chloride phase is separated, washed twice with brine, dried over anhydrous magnesium sulfate and evaporated to a residue. The residue is recrystallized from ether to afford 2-methyl-3-ethyl-4-hydroxy-4-(m-tetrahydropyranyloxyphenyl)cyclohexanecarboxylic acid, m.p. 149°–151°C.

μmax: 2.83, 5.88, 8.02, 8.98, 9.61, 10.34, 10.92 μ (KBr)

NMR (pyr.): 0.62, 0.73, 0.85; 1.46, 1.58; 2.95

Following the procedure of Example XIV, there are prepared:

EXAMPLE XV

2-Methyl-3-ethyl-4-hydroxy-4-(o-tetrahydropyranyloxyphenyl)cyclohexanecarboxylic acid; m.p. 164°–166°C.

μmax: 2.88, 5.87, 0.13, 10.24, 10.85, 11.52, 13.28 μ (KBr)

NMR (pyr.): 0.67, 0.79, 0.90; 1.47, 1.58; 2.97

EXAMPLE XVI

2-Methyl-3-ethyl-4-hydroxy-4-(o-methoxy-p-tetrahydro-pyranyloxyphenyl)cyclohexanecarboxylic acid, m.p. 118°–130°C.

μmax: 2.86, 5.87, 8.31, 9.62, 10.10, 11.04, 11.92 μ (KBr)

NMR (pyr.): 0.65, 0.76, 0.88; 1.46, 1.57; 2.93

NMR (CDCl$_3$): 0.67, 0.78, 0.89; 1.02, 1.13; 1.82, 2.57

EXAMPLE XVII

2-Methyl-3-ethyl-4-hydroxy-(o,p-bis-tetrahydropyranyloxyphenyl)cyclohexanecarboxylic acid, m.p. 100°–108°C.

μmax: 2.88, 5.87, 7.99, 9.61, 9.97, 10.38, 10.95, 11.85 μ (KBr)

NMR (pyr): 0.73, 0.85, 0.96; 1.52, 1.63; 2.98

Calcd. for C$_{26}$H$_{38}$O$_7$ : C, 67.51; H, 8.28

Found : C, 67.00; H, 8.33

EXAMPLE XVIII

2-Methyl-3-ethyl-4-hydroxy-4-(m-hydroxyphenyl)-cyclohexanecarboxylic acid

A suspension of 10.0 g. of 2-methyl-3-ethyl-4-hydroxy-4-(m-tetrahydropyranyloxyphenyl)cyclohexanecarboxylic acid (as prepared in Example XIV) in 260 ml. of methanol containing 35 ml. of water and 1.5 ml. of 12N hydrochloric acid is stirred at 25°C. for forth minutes. To the resulting clear solution is added 260 ml. of water and 5 ml. of pyridine and the solution is evaporated to remove methanol while precipitating the phenolic hydroxy acid. The mixture is acidified with dilute hydrochloric acid and the product is extracted with ether. The ether solution is washed twice with water, dried over anhydrous magnesium sulfate and evaporated to dryness. The residue is recrystallized from ether-methylene chloride to afford 2-methyl-3-ethyl-4-hydroxy-4-(m-hydroxyphenyl)cyclohexanecarboxylic acid, m.p. 211°–213°C.

μmax: 2.96, 3.15, 5.78, 7.50, 9.60, 10.26, 12.68, 13.-31, 14.23 μ (KBr)

NMR (pyr.): 0.63, 0.74, 0.85; 1.45, 1.57; 2.92

EXAMPLE XIX

2-Methyl-3-ethyl-4-hydroxy-4-(o-hydroxyphenyl)-cyclohexanecarboxylic acid

Following the procedure of Example XVIII, but starting with 2-methyl-3-ethyl-4-hydroxy-4-(o-tetrahydropyranyloxyphenyl)-cyclohexanecarboxylic acid (as prepared in Example XV), ther is afforded 2-methyl-3-ethyl-4-hydroxy-4-(o-hydroxyphenyl)cyclohexanecarboxylic acid, m.p. 190°–191°C.

μmax: 2.82, 3.04, 5.90, 8.06, 10.40, 10.69, 10.92, 13.23 μ (KBr)

NMR (pyr.): 0.67, 0.78, 0.89; 1.42, 1.53; 2.96

EXAMPLE XX

2-Methyl-3-ethyl-4-hydroxy-4-(o,p- dihydroxyphenyl)-cyclohexanecarboxylic acid

Following the procedure of Example XVIII, but starting with 2-methyl-3-ethyl-4-hydroxy-4-(o,p-bis-tetrahydropyranyloxyphenyl)cyclohexanecarboxylic acid (as prepared in Example XVII), there is afforded 2-methyl-3-ethyl-4-hydroxy-4-(o,p-dihydroxyphenyl)cyclohexanecarboxylic acid, m.p. 169°–171°C.

μmax: 2.85, 2.95, 3.12, 5.90, 8.62, 8.89, 10.21, 11.81, 12.10, 12.42 μ (KBr)
NMR (pyr.): 0.72, 0.82, 0.93; 1.40, 1.52; 2.92

EXAMPLE XXI

2-Methyl-3-ethyl-4-hydroxy-4-(o-methoxy-p-hydroxyphenyl-cyclohexanecarboxylic acid Following the procedure of Example XVIII, but starting with 2-methyl-3-ethyl-4-hydroxy-4-(o-methoxy-p-tetrahydropyranyloxyphenyl)cyclohexanecarboxylic acid (as prepared in Example XVI), there is afforded 2-methyl-3-ethyl-4-hydroxy-4-(o-methoxy-p-hydroxyphenyl)cyclohexanecarboxylic acid, m.p. 128°–131°C.

μmax: 2.95, 5.88, 8.31, 9.65, 10.33, 11.97 μ (KBr)
NMR (pyr.): 0.67, 0.78, 0.90; 1.46, 1.57; 2.94

EXAMPLE XXII

2-Methyl-3-ethyl-4-hydroxy-4-(m-acetoxyphenyl)cyclohexanecarboxylic acid

To a solution of 2.0 g. of 2-methyl-3-ethyl-4-hydroxy-4-(m-hydroxyphenyl)cyclohexanecarboxylic acid (as prepared in Example XVIII), in 25 ml. of pyridine is added with stirring 3 ml. of acetic anhydride. The solution is maintained at 25°C. for twenty hours and is then hydrolyzed with ice and water. The oily products are extracted with ether. The ether solution is washed with cold dilute hydrochloric acid to remove pyridine and is then extracted with three cold portions of 7 percent aqueous potassium carbonate with each successive carbonate wash being immediately acidified with dilute hydrochloric acid. A tacky precipitate from the carbonate solutions is extracted with ether and the combined ether solution is dried and evaporated at 25°C. The residue is recrystallized from ether to afford 2-methyl-3-ethyl-4-hydroxy-4-(m-acetoxyphenyl)cyclohexanecarboxylic acid, m.p. 172°–173°C.

μmax: 2.83, 5.68, 8.30, 9.63, 10.71, 12.73 μ (KBr)
NMR (pyr.): 0.61, 0.71, 0.82; 1.44, 1.55; 2.94

EXAMPLE XXIII

2-Methyl-3-ethyl-4-hydroxy-4-(o-acetoxyphenyl)-cyclohexanecarboxylic acid

Following the procedure of Example XXII, but starting with 2-methyl-3-ethyl-4-hydroxy-4-(o-hydroxyphenyl)cyclohexanecarboxylic acid (as prepared in Example XIX), there is afforded 2-methyl-3-ethyl-4-hydroxy-4-(o-acetoxyphenyl)cyclohexanecarboxylic acid, m.p. 132°–133°C.

μmax: 2.82, 5.72, 5.89, 8.20, 8.48, 13.09 μ (KBr)
NMR (pyr.): 0.68, 0.80, 0.91; 1.43, 1.55; 2.96

EXAMPLE XXIV

2-Methyl-3-ethyl-4-hydroxy-4-(o,p-diacetoxyphenyl)-cyclohexanecarboxylic acid

Following the procedure of Example XII, but starting with 2-methyl-3-ethyl-4-hydroxy-4-(o,p-dihydroxyphenyl)cyclohexanecarboxylic acid (as prepared in Example XX), there is afforded 2-methyl-3-ethyl-4-hydroxy-4-(o,p-diacetoxyphenyl)cyclohexanecarboxylic acid, m.p. 110°–112°C.

μmax: 2.85, 5.68, 8.10-8.40, 9.80, 10.87 μ (KBr)
NMR (CDCl₃): 0.64, 0.75, 0.86; 0.99, 1.10; 1.89, 2.59

The o-acetoxyphenyl-hydroxy acids prepared according to Examples XXIII and XXIV are unstable and begin to decompose after a few days at 25°C. They are fully decomposed within two to three weeks at 25°C. The decomposition follows the route:

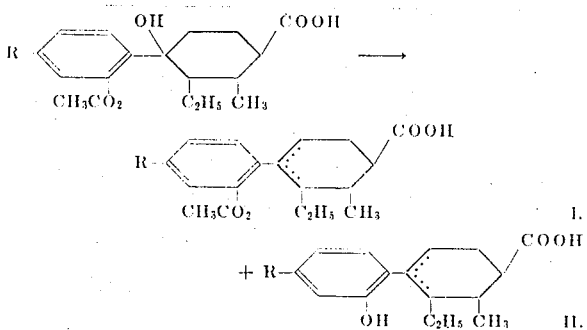

Compounds I and II are mixtures of the Δ³ and Δ⁴ isomers.

EXAMPLE XXV

2-Methyl-3-ethyl-4-hydroxy-4-(m-chlorophenyl)-cyclohexanecarboxylic acid

The Grignard reagent from 0.32 mole of m-chlorobromobenzene, prepared in a mixture of ether and tetrahydrofuran, is stirred at −40° and to it is added 0.1 mole of 2-methyl-3-ethyl-4-ketocyclohexanecarboxylic acid in 40 ml. of tetrahydrofuran. This reaction mixture is stirred vigorously and heated at the reflux temperature for two hours and then it is cooled in ice and hydrolyzed with 400 ml. of saturated aqueous ammonium acetate. After filtration to remove magnesium, the layers are separated and the organic phase is dried and evaporated to a tacky, semi-crystalline residue. Recrystallization from ether or nitromethane affords 9.0 g. of 2-methyl-3-ethyl-4-hydroxy-4-(m-chlorophenyl)-cyclohexanecarboxylic acid, m.p. 166°–169°C.

μmax: 2.83, 5.89, 8.01, 12.77, 13.79 μ (KBr)
NMR (pyr.): 0.59, 0.70, 0.80; 1.40, 1.52; 2.92

The alkyl esters of the compounds of the invention are prepared by treatment of metal salts of the hydroxyacids with an appropriate dialkyl sulfate.

EXAMPLE XXVI

Methyl-2-methyl-3-ethyl-4-hydroxy-4-phenylcyclohexanecarboxylate

A solution of 4.0 g. of 2-methyl-3-ethyl-4-hydroxy-4-phenylcyclohexanecarboxylic acid and 1.5 g. of sodium hydroxide in 40 ml. of methanol and 150 ml. of dimethylformamide is evaporated under vacuum to a volume of 100 ml. The resulting suspension is stirred and cooled to 15°C. 3.5 ml. of dimethyl sulfate is added and the mixture is stirred at 25°C. for thirty minutes and is then evaporated under vacuum to remove most of the dimethylformamide. The residue of about 15–20 ml. is shaken with ether and water, and the ether solution is washed with cold 5 percent sodium hydroxide, followed by four portions of water. The ether solution is dried and evaporated to a residue. The residue is recrystallized from hexane to afford methyl 2-methyl-3-ethyl-4-hydroxy-4-phenylcyclohexanecarboxylate, m.p. 112°–113°C.

μmax: 2.87, 5.79, 8.21, 8.55, 13.29, 14.30 μ (KBr)
Calcd for $C_{17}H_{24}O_3$ : C, 73.88; H, 8.75
Found : C, 74.00; H, 8.76

EXAMPLE XXVII

Methyl 2-methyl-3-ethyl-4-hydroxy-4-(p-trifluoromethylphenyl)cyclohexanecarboxylate Following the procedure of Example XXVI, but starting with 2-methyl-3-ethyl-4-hydroxy-4-(p-trifluoromethylphenyl)cyclohexanecarboxylic acid, there is afforded methyl 2-methyl-3-ethyl-4-hydroxy-4-(p-trifluoromethylphenyl)cyclohexanecarboxylate, m.p. 112°–113°C.

μmax: 2.89, 5.88, 7.49, 7.82, 8.61, 8.90, 9.29, 9.84, 11.81, 12.04 μ (KBr)
Calcd. for $C_{18}H_{23}O_3F_3$ : C, 62.79; H, 6.73
Found : C, 63.07; H, 6.73

EXAMPLE XXVIII

Methyl 2-methyl-3-ethyl-4-hydroxy-4-(m-trifluoromethylphenyl)cyclohexanecarboxylate Following the procedure of Example XXVI, but starting with 2-methyl-3-ethyl-4-hydroxy-4-(m-trifluoromethylphenyl)cyclohexanecarboxylic acid, there is afforded methyl 2-methyl-3-ethyl-4-hydroxy-4-(m-trifluoromethylphenyl)cyclohexanecarboxylate, m.p. 122°–124°C.

μmax: 2.87, 5.80, 7.50, 8.61, 8.87, 9.24, 12.50, 14.17 μ (KBr)
Calcd. for $C_{18}H_{33}O_3F_3$ : C, 62.79; H, 6.73
Found : C, 62.67; H, 6.73

Following the procedure of Example XXVI by the selection of the appropriate hydroxy acid and dialkyl sulfate, there are prepared:

ethyl 2-methyl-3-ethyl-4-hydroxy-4-benzylcyclohexanecarboxylate,
propyl 2-methyl-3-propyl-4-hydroxy-4-benzylcyclohexanecarboxylate,
ethyl 2-ethyl-3-methyl-4-hydroxy-4-benzylcyclohexanecarboxylate,
ethyl 2,3-dimethyl-4-hydroxy-4-benzylcyclohexanecarboxylate,
ethyl 2,3-diethyl-4-hydroxy-4-benzycyclohexanecarboxylate,
butyl 2-methyl-3-ethyl-4-hydroxy-4-benzylcyclohexanecarboxylate,
butyl 2-ethyl-3-butyl-4-hydroxy-4-benzylcyclohexanecarboxylate,
butyl 2-methyl-3-ethyl-4-hydroxy-4-(m-tolyl)cyclohexanecarboxylate, and
butyl 2-methyl-3-propyl-4-hydroxy-4-(m-tolyl)cyclohexanecarboxylate.

What is claimed is:

1. A compound of the formula:

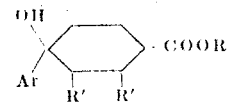

wherein R is selected from the group consisting of hydrogen and lower alkyl of up to eight carbon atoms, R' is selected from the group consisting of lower alkyl of up to six carbon atoms and Ar is selected from the group consisting of

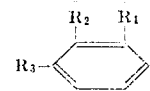

2. 2-Methyl-3-ethyl-4-hydroxy-4-(m-acetoxyphenyl)-cyclohexanecarboxylic acid according to claim 1.

3. 2-Methyl-3-ethyl-4-hydroxy-4-(o-acetoxyphenyl)-cyclohexanecarboxylic acid according to claim 1.

4. 2-Methyl-3-ethyl-4-hydroxy-4-(o,p-diacetoxyphenyl)-cyclohexanecarboxylic acid according to claim 1.

* * * * *

PO-1050
(5/69)

UNITED STATES PATENT OFFICE
CERTIFICATE OF CORRECTION

Patent No. 3,742,028           Dated June 26, 1973

Inventor(s) George Karmas

It is certified that error appears in the above-identified patent and that said Letters Patent are hereby corrected as shown below:

In Column 1, line 32, "dimethylamino tetrahydropyranyl" should read --- "dimethylamino or tetrahydropyranyl" ---.

In Column 1, line 33, "delete second occurrence of tetrahydrophyranyl" ---.

In Column 3, lin3 12, "12.78, .62m" should read --- 12.78, 1362m ---.

In Column 3, line 15, "2.85, 5.83 and 5.87" should read --- 2.85, 5.83 and 5.97" ---.

In Column 4, line 1, "0.13" should read --- "8.13" ---.

In Column 4, line 58, "ther" should read --- "there" ---.

In Column 5, line 66, "X11" should read --- "XX11" ---.

In Column 6, line 7, "(CDC1c8$_3$)" should read --- "(CDCl$_3$)" ---

In Column 8, Claim I, line 35, "claim I should continue --- wherein R1 R2 and R3 are hydrogen or lower alkoxy of up to 5 carbon atoms and wherein at least 1 and not more than 2 of R1, R2 and R3 is hydrogen Signed and sealed this 24th day of September 1974.

(SEAL)
Attest:

McCOY M. GIBSON JR.           C. MARSHALL DANN
Attesting Officer             Commissioner of Patents